United States Patent [19]

Häb-Umbach et al.

[11] Patent Number: 5,995,930

[45] Date of Patent: *Nov. 30, 1999

[54] METHOD AND APPARATUS FOR RECOGNIZING SPOKEN WORDS IN A SPEECH SIGNAL BY ORGANIZING THE VOCABULARY IN THE FORM OF A TREE

[75] Inventors: Reinhold Häb-Umbach; Hermann Ney, both of Aachen, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/751,377

[22] Filed: Nov. 19, 1996

Related U.S. Application Data

[63] Continuation of application No. 08/563,853, Nov. 29, 1995, abandoned, which is a continuation of application No. 07/944,554, Sep. 14, 1992, abandoned.

[30] Foreign Application Priority Data

Sep. 14, 1991 [DE] Germany .............. 41 30 631

[51] Int. Cl.⁶ ...................... G10L 5/06
[52] U.S. Cl. ............ 704/254; 704/245; 704/257
[58] Field of Search ............... 395/2.5, 2.54, 395/2.6–2.66, 2.4, 2.09, 2.49; 382/170

[56] References Cited

U.S. PATENT DOCUMENTS

| | | | |
|---|---|---|---|
| 4,759,068 | 7/1988 | Bahl et al. | 395/2.51 |
| 4,805,219 | 2/1989 | Baker et al. | 395/2.5 |
| 4,837,831 | 6/1989 | Gillick et al. | 395/2.49 |
| 4,947,438 | 8/1990 | Paeseler | 395/2.61 |
| 5,040,127 | 8/1991 | Gerson | 395/2.64 |
| 5,054,074 | 10/1991 | Bakis | 395/2.49 |
| 5,228,110 | 7/1993 | Steinbiss | 395/2.09 |
| 5,241,219 | 8/1993 | Schwartz et al. | 395/2 |
| 5,329,596 | 7/1994 | Sakou et al. | 382/226 |
| 5,613,034 | 3/1997 | Ney et al. | 704/251 |
| 5,621,859 | 4/1997 | Schwartz et al. | 395/2.65 |
| 5,634,083 | 5/1997 | Oerder | 395/2.62 |

FOREIGN PATENT DOCUMENTS

| | | | |
|---|---|---|---|
| 3215868 | 11/1983 | Germany | G10L 1/04 |
| 3710507 | 10/1988 | Germany | G10L 7/08 |

OTHER PUBLICATIONS

Specification for 08/425,304 (Marked "PHD 91,136").

*Primary Examiner*—David R. Hudspeth
*Assistant Examiner*—Donald L. Storm

[57] ABSTRACT

A method and apparatus for processing a sequence of words in a speech signal for speech recognition. The method includes the steps of sampling, at recurrent instants, said speech signal for generating a series of test signals. Signal-by-signal matching and scoring is generated between the test signals and a series of reference signals, where each of the series of reference signals forms one of a plurality of vocabulary words arranged as a vocabulary tree. The vocabulary tree includes a root and a plurality of tree branches wherein any tree branch has a predetermined number of reference signals and is assigned to a speech element and any vocabulary word is assigned to a particular branch junction or branch end. Acoustic recombination determines both continuations of branches and the most probable partial hypotheses within a word because of the use of a vocabulary built up as a tree with branches having reference signals. At least one complete word for a particular test signal is determined, and, separately, for each completed word, there is: I) a word result formed including a word score and an aggregate score, said aggregate score derived from said word score and from a language model value assigned to a combination of said completed word and a uniform-length string of prior completed words.

14 Claims, 3 Drawing Sheets

| 1 | 3 | 4 | Ra1 | Ra2 | | 0 |
|---|---|---|---|---|---|---|
| 2 | 5 | 7 | Rb1 | Rb2 | | 0 |
| 3 | 8 | 10 | | | | W1 |
| 4 | | | | | | W2 |

METHOD AND APPARATUS FOR RECOGNIZING SPOKEN WORDS IN A SPEECH SIGNAL BY ORGANIZING THE VOCABULARY IN THE FORM OF A TREE

This is a continuation of application Ser. No. 08/563,853, filed Nov. 29, 1995, now abandoned; which is a continuation of application Ser. No. 07/944,554, filed Sep. 14, 1992, now abandoned.

FIELD OF THE INVENTION

The invention relates to a method for recognizing a sequence of words in a speech signal, said method comprising the steps of:

at recurrent instants sampling said speech for generating a series of test signals;

executing a signal-by-signal matching and scoring between said test signals and various series of reference signals from a set of such series that each represent a vocabulary word and for each so completed word deriving a word result comprising a word score, an aggregate score derived from said word score and from a language model value assigned to a combination of the completed word and a uniform-length string of completed predecessor words, and also a reference to the last word of said string;

proceeding said matching and scoring for subsequent test signals and recognizing said speech on the basis of selecting a minimum among aggregate scores.

Such a method is known from DE-PS 32 15 868. This is a single-stage method with non-linear time adaptation achieved through dynamic programming within the words and through a determination of optimal word transitions. Whenever a word end is reached, the search through the entire vocabulary is continued. This leads to a very large searching space, which requires much calculation time for a vocabulary of 10,000 words or more, so that the recognition takes place slowly.

An improved method is known, from DE-OS 37 10 507. In this method, the searching space is continuously contracted through regular comparisons of all hypotheses with a threshold value. An increase in the reliability of the recognition can be achieved through the use of a language model which takes syntactic interrelationships into account, for example, in the form of statistic probabilities. A language model value is added to the words which are included in the comparisons anew at the end of every word, which language model value depends on the combination of the new word just begun and the preceding word in the case of a bigram language model, or the n−1 preceding words in the case of an n-gram language model. Nevertheless, a large vocabulary on average leads to a large searching space which depends substantially directly on the size of the vocabulary and thus requires much calculation time.

It is an object of the invention to provide a method of the kind mentioned in the opening paragraph which operates more quickly without an appreciable loss of recognition reliability.

SUMMARY TO THE INVENTION

According to the invention, this object is achieved in that arranging said vocabulary as a tree with a root, wherein any tree branch has a number of reference signals and is assigned to a speech element and any vocabulary word is assigned to a particular branch junction or branch end, and for each of a plurality of words completed simultaneously, separately storing scoring results from said proceeding as starting at said root, together with a reference to the associated completed word, while among identical words in said plurality keeping only one with the lowest aggregate score.

The invention is based on an organization of the vocabulary as a tree structure. The vocabulary, which may also be referred to as a pronunciation lexicon, gives the pronunciation for each word as a sequence of speech sounds or word subdivisions, for example, phonemes. The pronunciation lexicon, especially in European languages, can be represented with only a very limited number of phonemes, for example, approximately 50 phonemes in the German language. Since many words start with the same phoneme sequence, a storage of the pronunciation lexicon as a tree is more compact than a straight table which contains a phonetic transcription of each word and which can be regarded as a linear lexicon. Each branch in the tree structure corresponds, for example, to one phoneme and at least a portion of the junction points or branch ends correspond to word ends. The sequence of the phonemes from the tree root up to such junction point or branch end then constitutes the phonetic transcription of a word.

The referenced method of time-synchronous lateral search has the comparisons of each test signal with a number of reference signals and accordingly the continuation of the partial hypotheses under consideration taking place quasi in parallel. If this is applied to the pronunciation lexicon organized into a tree, a clear reduction of the searching space and thus also of the searching activity or calculation time is achieved. The more compact representation of the words alone through combining of words having the same word beginnings directly leads to a smaller searching space. Another essential point is that, because of the continuous comparison of all partial hypotheses with a threshold value and because of the termination of partial hypotheses which exceed the threshold value, more than 95% of the searching activity for the beginnings of the newly started partial hypotheses after each word end is eliminated when the first two phonemes of a word are counted as beginnings. In the known linear lexicon of, for example, 12,000 words, 24,000 phonemes would then have to be processed each time, whereas in the tree structure of the vocabulary according to the invention only 30 phonemes are present as the first branches, i.e. in the first level of the tree, plus about 350 phonemes in the second level.

It could be regarded as a disadvantage in the tree structure that copies of trees are to be made already for n≧2 when a statistical n-gram language model is used, i.e. already for a bigram language model. The reason for this is that the word identity is not yet known at the root of the tree, so that the language model evaluation cannot be carried out until at the word end and not at the beginning of each partial hypothesis. The result is that the potential searching space increases with the size of the vocabulary. Practical results have shown, that in fact only few copies are necessary because of the threshold value comparison and the termination of unfavourable partial hypotheses. It is also possible to carry out the language model evaluation at the word end in a manner as indicated in U.S. Pat. No. 5,613,034 entitled "Method And Apparatus For Recognizing Spoken Words In A Speech Signal" with the same priority date as the present document and herein incorporated by reference. This method uses a certain approximation to the optimal word limit, but the errors caused by this do not have an appreciable effect. When this method is used, it is not necessary to make a copy of the search tree for each word end in the case of a bigram language model.

Because of the large potential searching space, however, a careful organization of the entire recognition procedure is necessary. To this end, the trees and branches active at any time are arranged in lists in a certain manner according to the invention, so that the searching activity and storage space requirement are essentially independent of the size of the potential searching space.

A further limitation of the searching space is possible when a look-head at the phoneme level is carried out, as is indicated in U.S. patent application Ser. No. 08/425,302 which has the same priority date and is herein incorporated by reference. The use of this look-ahead will be explained in more detail later.

In the arrangement of the lists according to the invention it may be effective to include in each line of the first list an indication of the search list, so as to achieve in a simple manner that the list positions of the search list, which each belong to a tree, form a coherent region. Furthermore, the use of an auxiliary list is effective in which for each line in the first list the tree identity, i.e. the word from which the tree was started, is present with the indication of the accompanying line in the first list. It can be ascertained without substantial searching activity thereby whether a tree starting from this word had already been started and is still active. Favourably, each list position in the branch list contains for an active branch the indication of this branch, for example the branch number, assuming that all branches of the vocabulary tree are numbered in sequence. The use of an auxiliary list may also be effective for this purpose, this auxiliary list containing an indication for each branch number as to in which list positions of the branch list this branch is active.

When the phonemes are arranged in a manner as indicated in DE-OS 37 11 342, in which consecutive reference values within the phoneme are equal at least segment by segment, the search list need have only one list position for each individual reference value. The score and the indication as to the beginning of the sequence, however, must then be included separately for each situation in each list position.

BRIEF DESCRIPTION OF THE FIGURES

Embodiments of the invention are described in more detail below with reference to the drawing, in which.

DESCRIPTION OF A PREFERRED EMBODIMENT

Figures 1A, 1B:
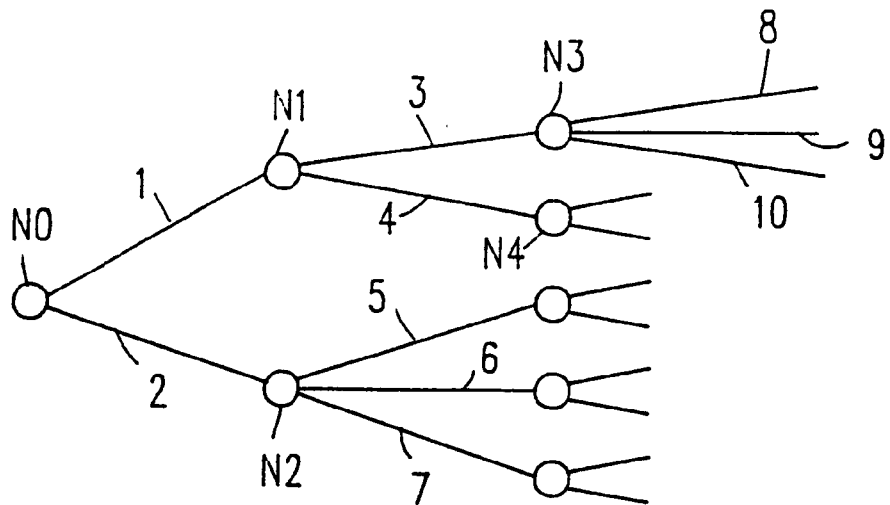
FIG. 1a diagrammatically shows the tree arrangement of the vocabulary.
FIG. 1b shows a list structure, depicting the arrangement of the vocabulary as a tree and used for recognition.

To explain the arrangement of the vocabulary into a tree, FIG. 1 shows a simplified picture based on a very small number of different phonemes, that is organized as a tree, comprising junctions N0, N1, N2 . . . and interconnections or branches 1, 2, 3. Each interconnection represents a particular phoneme. A particular phoneme may be assigned to more than one interconnection. Initial junction N0 is regarded as the root. In practice, the number of phonemes starting from this root is much higher. Starting from N0, there are two phonemes 1 and 2, with which accordingly all words of the vocabulary assumed here will start, i.e. a first group of words has the phoneme 1 as its beginning, and the remaining second group of words has the phoneme 2 as its beginning. Starting from the junction point Ni at the end of the phoneme 1, there are two further phonemes 3 and 4, i.e. in all words of the first group the phoneme 1 is followed either by the phoneme 3 or by the phoneme 4. Starting from the junction point N2 at the end of the phoneme 2 there are three phonemes 5, 6 and 7, i.e. in the second group of words the phoneme 2 may be followed by either the phoneme 5, the phoneme 6, or the phoneme 7. Three phonemes 8, 9 and 10 again start from the junction point N3, i.e. word groups belong to this branch in which after the phoneme 3 and the subsequent phoneme 3 there is either the phoneme 8, the phoneme 9 or the phoneme 10. It should be noted that some of the phonemes 1 to 10 may be acoustically identical to one another, i.e. they are represented by the same reference values, but since they are present in different locations in the vocabulary tree, they must be treated separately in the recognition process.

This tree structure of the vocabulary must now be stored in such a form that it can be used for the recognition. This is done, for example, in the form of a list as shown in FIG. 1b. It is assumed here that the individual phonemes in the tree structure have been numbered consecutively in accordance with their positions in the tree. Each phoneme number is then assigned a memory field, which is also shown in FIG. 1b as a row of positions, where in the first position the number of the phoneme is indicated, and in the two next positions the first and the last number of the phonemes that may follow this first phoneme. In the first memory field, these are the phonemes 3 and 4 for the phoneme 1. Reference values $R_{a1}$, $R_{a2}$, etc. are stored in the next positions, directly or in the form of addresses of a further memory or memory region where these reference values have been stored, and where the values arising during the recognition process are stored.

In the second memory field, which is assigned to the phoneme 2, the first number 5 and the last number 7 of the phonemes following this phoneme 2 are stored in the second and third location, followed again by the reference values $R_{b1}$, $R_{b2}$, etc., or the corresponding memory locations of the further memories for these reference values.

In the third field, assigned to the phoneme no. 3, the numbers of the first and last subsequent phonemes are again indicated in the second and third field, and a word number W1 is indicated in the last field, this word by indicating the sequence of the phonemes 1 and 2 ending at juntion point N3. It is assumed at junction points N1 and N2 that no words have yet ended there, since words consisting of only a single phoneme practically do not occur in natural language. In the fields on the extreme right of the first two memory locations there is accordingly an information present indicating that no words are associated with these junction points, for example, the value 0 is present in these locations.

Similarly, the fourth line for the phoneme 4 reserves the second and third location for the numbers of the subsequent phonemes, which are no longer entered here for the sake of simplicity, and it is assumed that a word W2 is associated with the junction point N4, which word therefore consists of the sequence of phonemes 1 and 4. It should be noted that in a real vocabulary tree according to FIG. 1a many junction points of branches will occur in the further levels not shown, to which also a word may, or may not be assigned.

Basically, three functions can be distinguished in the recognition process, as is also the case in known recognition processes using a linear lexicon. One of these functions is the control, which controls the implementation of the two others and the processing of the intermediate results and the output of the results at the end of the speech signal. The second function relates to the acoustic recombination which determines the most probable sequence of conditions or reference values, so the most probable partial hypothesis within a word. The third stage relates to the language model recombination whereby the most probable interconnection of words is determined. In this stage the language model values are also taken into account. Owing to the use of a vocabulary built up as a tree and comprising branches representing phonemes, however, continuations of branches are also determined here during the acoustic recombination. The construction of new trees or the reactivation of the beginnings of already existing trees are carried out during the language model recombination, which implies in each case the start of the branches at the first level of the vocabulary tree. So in either case new branches are included in the continuing search process, but with different conditions and assumptions.

Figure 2:
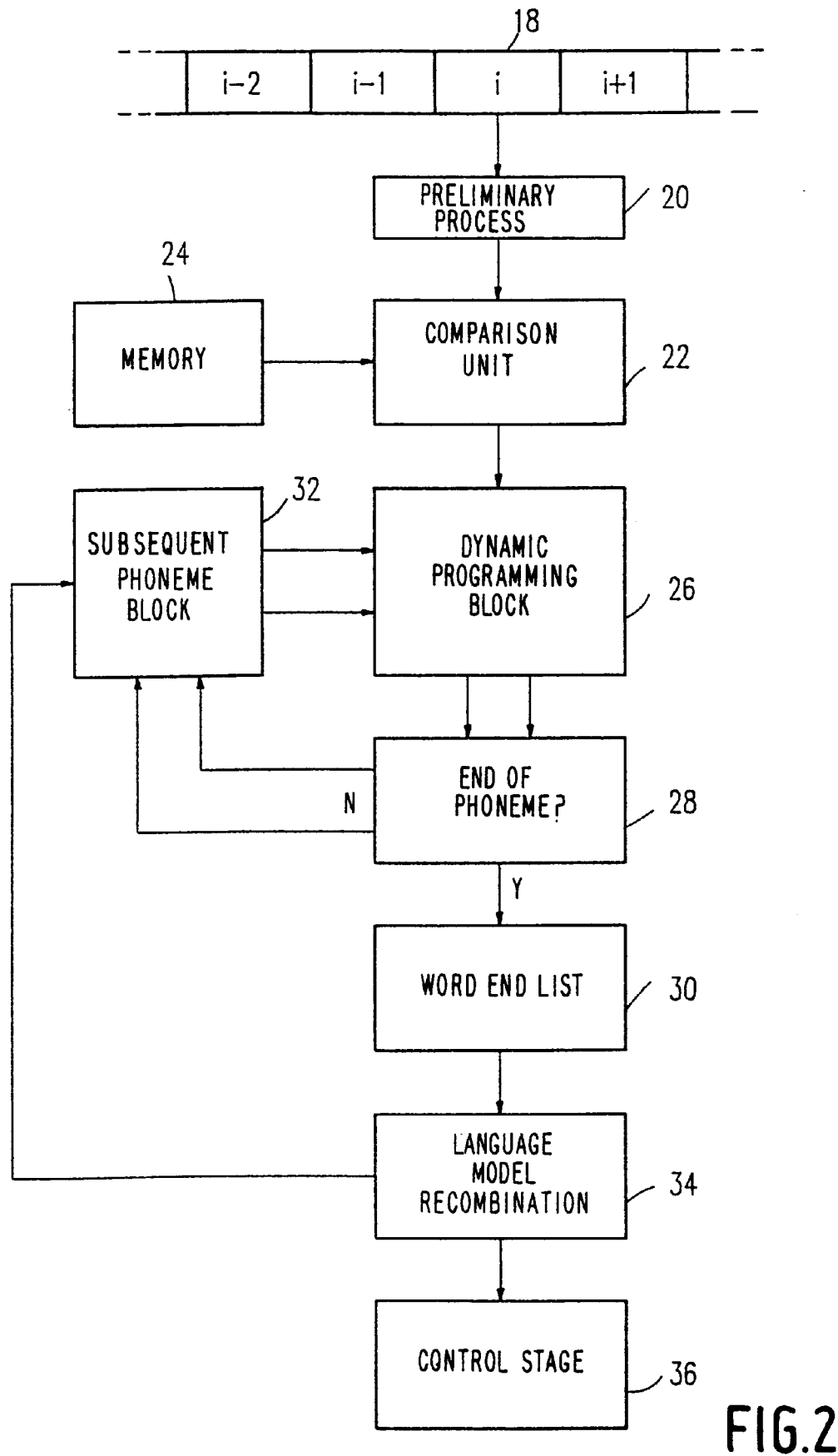
FIG. 2 is a flowchart of the recognition process.

The outline schedule of the searching and recognition process can be seen in more detail in FIG. 2. A continuous speech signal, which was obtained through a microphone from an acoustic speech signal, is supplied in the form of a sequence of scanned values 18 discrete in time, which are given time indices i−2, i−1, i, i+1, to a preliminary process 20 in which a sequence of test signals is determined which each characterize a section of the speech signal. The test signals are compared with reference signals from a corresponding memory 24 in a unit 22, and the comparison results are supplied at the output as scores.

These scores are used in block 26 for the dynamic time adaptation by means of the dynamic programming, whereby new scores are formed. These are supplied to a block 28 and compared there with a threshold value, so that partial hypotheses whose scores exceed the threshold value are not continued. Furthermore, it is determined in block 28 whether and, if so, which partial hypotheses have reached the end of a phoneme, in which case the phonemes to be continued are determined with reference to the list shown in FIG. 1b. In addition, it is tested whether a phoneme end reached also simultaneously represents a word end. If this is the case, the relevant word is written into a word end list 30 with the accompanying data. This list represents the transition to the stage of language model recombination. The data of the partial hypotheses not concluded, i.e. the scores and the indications as to the beginnings of these partial hypotheses and their continuation into subsequent phonemes are fed to a block 32. This starts new trees and the first phonemes thereof, i.e. new partial hypotheses, in dependence on the language model recombination. It also supplies the scores associated and indications as to beginnings together with the data supplied by the block 28 to the block 26 again, so that the next test signal and the scores derived therefrom can be processed.

The contents of the word end list 30 are now supplied to block 34 for language model recombination. For this purpose, the relevant language model value is first added to the scores of each word. If the same word occurs more than once, which is only possible starting from different preceding words (or word combinations, subject to the language model), only the word having the best evaluation result, which is formed by the sum of the scores and the language model value, is continued. These words are transferred on the one hand to the control stage 36 for storage in the results list, and on the other hand they are used to control the block 32 for starting new trees, and thus new partial hypotheses, as described above.

Figure 3:
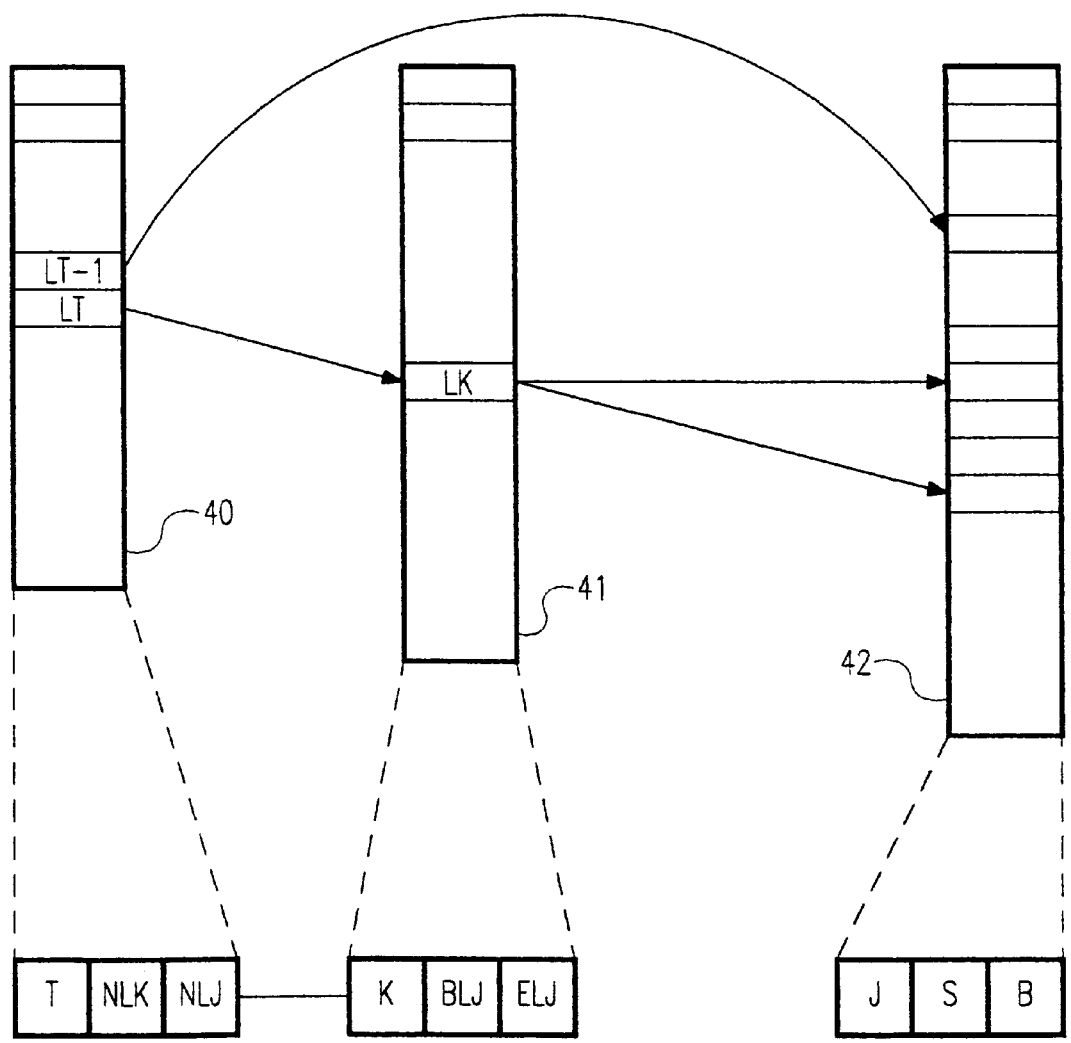
FIG. 3 shows the arrangement and interrelationship of the most important lists used in the method according to the invention.

Several lists are used during the process, the most important ones of which are shown in FIG. 3 with an indication of the interrelationship and the more exact arrangement of the individual list positions. First of all there is the first list or tree list 40, which has a list position LT for each search tree, i.e. for each bunch of partial hypotheses having the same origin. In the first part of the list position there is an identification T of the relevant tree which may directly indicate the preceding word when the bigram language model is used. In the second part of each list position there is an indication NLK as to a list position of a branch list 41, and in the third part an indication NLJ as to a list position in a search list 42.

Each list position of the branch list 41 is associated with an active branch, i.e. a phomene, in which the search process is active at this moment and whose number K is given in the first part of the memory location. The second and third parts contain indications BLJ, ELJ referring to the first and the last list position, respectively of a coherent region of list positions in the search list 42. This coherent region is reserved for the active reference values within the branch K and contains in the first part the serial number J of the reference value within the phoneme K, in the second part the score S which was reached during preceding comparisons or put in at the re-start of the branch, and in the third part an indication B as to the beginning of a sequence of reference values which may extend over several phonemes.

At the start of the entire process, i.e. before the start of the speech signal, first a list position is written into the tree list 40, which position represents the beginning of the word chain to be recognized, but to which no preceding word can be assigned. The first branches, i.e. the first level of the vocabulary tree, are entered into the branch list 41 for this tree, and the corresponding reference values are entered in the search list 42.

At each following test signal the score determined from the comparisons with the reference values are now added to the relevant score in the list positions of the search list 42 so as to form new score, so that a new minimum score results each time. All active list positions of the tree list 40 are consecutively addressed for addressing the individual reference values for which the difference values and the new scores are formed, in which process it should be noted that a plurality of search trees are active during the progressing search process. The relevant list positions of the branch list 41 are consecutively addressed for each list position of the tree list, starting each time from the start or from the final list position of the preceding tree. As a result, only the last corresponding list position of the branch list 41 is indicated in each list position of the tree list 40. Each branch list position then calls the relevant reference values via the search list positions indicated therein. During this, the lowest score is simultaneously determined in all list positions of the search list 42, from which then a threshold value is formed.

When all active list positions of the tree list 40, and thus all active list positions of the branch list 41 have been processed in this manner, this addressing process is repeated, whereby all differential sums in the search list 42 are once more compared with the threshold value. The list positions for those reference values whose scores exceed the threshold value are erased. This can take place in the simplest manner in that the memory locations not erased in the search list 42 are so shifted back that a coherent region is again created. The—possibly changed—list positions are entered into the second and third parts of the relevant list position of the branch list 41.

If during this the last reference value in the search list 42 is active and was not erased, and a word of the vocabulary belongs to the end of the phoneme associated with the instantaneously processed list position of the branch list 41, this word together with the tree identity indicated in the first part of the relevant list position of the word end list and with the score and the indications contained in the second and third parts of the relevant list position of the last reference value in the search list is stored in the word end list. Finally, it is tested whether there is any active reference value, i.e. a list position of the search list 42 not erased, which still belongs to the relevant list position of the branch list 41, and if this is the case, the contents of this list position are written back into the branch list 41, so that a coherent region is maintained at all times.

Finally, it is tested whether one of the two last reference values in the search list 42 is active for the list position written back into the branch list 41, and if this is the case, it is ascertained through the vocabulary list which phonemes can follow the phoneme indicated in the list position of the branch list 41, and corresponding list positions in the branch list 41 and in the search list 42 are prepared for these phonemes. A look-ahead may also be carried out at this moment, as indicated in U.S. patent application Ser. No. 07/944,553 of the same priority date. In that case, list positions are only prepared in the branch list 41 and the search list 42 for those phonemes or reference values for which the look-ahead has yielded a sufficiently favourable score.

One list position of the branch list 41 has now been completely processed in this way, and the next position of the branch list 41 can be called, for which again the scores of the relevant reference values are compared with a threshold value.

When the final list position of a coherent region of list positions in the branch list 41 to which the instantaneous list position of the tree list 40 contains an indication, has been processed, it is tested whether in the branch list 41 there are still list positions left which belong to this list position of the tree list. If this is the case, the relevant list position of the tree list 40 is written back again, if not, the tree is automatically erased in that it is no longer included in the tree list 40.

Subsequently, the word end list is processed in that a language model value, which depends on the language model used, is added to the score which has been stored with each word. If identical words are present in the word end list here, so starting from different preceding words, all words except those having the smallest aggregate score are erased. The remaining words are now stored in the results list, where they are available for the verification of the best overall hypotheses at the end of the speech signal. In addition, new list positions are provided for these words in the tree list 40, if required. For this purpose it is is first tested whether a list position in the tree list 40 with the same identity, i.e. with the same contents of the first part, is already present. In order to carry out this test more quickly, a list position is written into an auxiliary list, which contains for each tree identity the list position in the tree list 40, at every input or at every writing-back of a list position into the tree list. As a result, the test whether a tree having a certain identity is already present, and where it is present, can take place very quickly.

If no tree in the tree list 40 is active for the relevant word of the word end list, a new list position is provided for it in the tree list 40, and new list positions are provided in the branch list 41 with the phonemes of the first level of the vocabulary tree, in as far as they were not already present there, for each tree which was already present in the tree list 40 according to the word end list or which was provided as a new one, and corresponding list positions are provided in the search list 42 for the first reference values of the phonemes of the first level, and the corresponding data are entered. At this point, also, the look-ahead can be taken into account in that only those list positions in the branch list 41 are entered for which the phonemes have received a sufficiently favourable score.

The next test signal can now be processed. After the last test signal has been processed, the results list is scanned starting from the word in the word end list having the best evaluation result and the word sequence resulting therefrom is given as an output, i.e. a recognized word sequence.

The method described above relates in particular to the use of a bigram language model. If a unigram language model is used, it is not necessary to make a separate search tree for each word ending at a test signal, so that also the tree list and thus the branch list are not necessary, but on the contrary the search space can be explicitly constructed.

Figure 4:
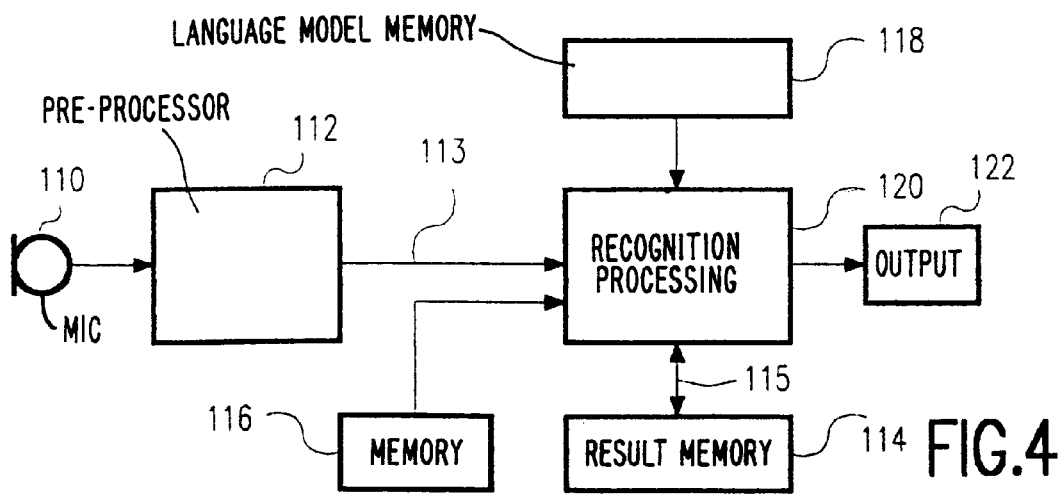
FIG. 4 is a block diagram of an apparatus according to the invention.

FIG. 4 shows a simplified block diagram of a device for speech recognition. Herein, the speech signal obtained through microphone 110 is preprocessed in a device 112, in particular the spectral components are digitized for consecutive speech signal sections, whereby the totality of the values which each represent a speech signal section forms a test signal. These test signals, which are present at line 113, are supplied to the recognition device 120. This recognition device constructs various hypotheses using reference signals contained in memory 116. Finally, the device 120 supplies the sequence of recognized words to an output device 122, for example, a display or a printer.

The device 120 for the actual recognition may be realized according to patent DE-OS-37 10 507. During the search, i.e. during processing of the consecutive test signals, a plurality of hypotheses is built up in that case in a searching space comprising the test signals and the reference signals, so that hypotheses with an unfavourable score that exceeds a threshold value, are discontinued, and whenever a possible word end is reached, a branching into a number of hypotheses leading further into new words to be started, which are determined on the basis of the language model. Generally, the use of the above searching space has been described in a paper by H. Ney et al., A data driven organization of the dynamic programming beam search for continuous speech recognition; © 1987, IEEE, No. CH 2396-0/87/0000/0633.

During search, intermediate results are written into a result memory 114 which contains the different lists. Intermediate results are in the present example all words terminating during search, together with associated scores or indications to scores and indications to relevant predecessor words. Continuations in the search are based on selecting one or more minimal scores. The further scores for consecutive words terminating during the continuation of the search are determined by using preceding scores which have to be read from the result memory 114 and supplied to the device 120. The connection 115 between result memory 114 and device 120 is bidirectional for that reason. The further scores are determined from the scores of the terminating word themselves and the scores read out from result memory 114, incremented with languale model values from a memory 118 for the combination of the terminating words and the chain of the most recently preceding words. This chain comprises one word (bigram), two words (trigram), etc. At the end of the speech signal the device 120 determines the sequence of words having highest probability on the base of the minimum overall score via the result memory.

What is claimed is:

1. A method for processing a sequence of words in a speech signal for speech recognition, said method comprising the steps of:

sampling, at recurrent instants, said speech signal for generating a series of test signals;

generating a signal-by-signal matching and scoring between said test signals and a series of reference signals, each of said series of reference signals forming one of a plurality of vocabulary words arranged as a vocabulary tree with a root, and a plurality of tree branches wherein any tree branch has a predetermined number of reference signals and is assigned to a speech element and any vocabulary word is assigned to a particular branch junction or branch end;

determining at least one complete word for a particular test signal;

for each completed word, separately:

forming a word result including a word score and an aggregate score, said aggregate score derived from said word score and from a language model value assigned to a combination of said completed word and a uniform-length string of prior completed words;

storing said aggregate score starting at said root with a reference to said completed word;

proceeding with said signal-by-signal matching and scoring between subsequent test signals and said series of reference signals for each of a plurality of words completed for a particular test signal.

2. The method as claimed in claim 1, wherein the step of storing includes intermediately storing a first list having a varying number of lines, each line including an indication to a new part of a first memory and an indication to said completed word.

3. The method as claimed in claim 2, wherein each new part of said first memory includes a predetermined number of memory locations, each of said memory locations containing an indication to a reference signal in said vocabulary tree and a respective score.

4. The method as claimed in claim 2 wherein:

each indication in the first list to said new part of said first memory, comprises an indication to a number of lines of a branch list;

each branch list line comprises an indication to a number of lines of a search list;

each search list line comprises an indication to at least one reference signal to be used for matching and scoring with a next test signal;

an indication is given to a predecessor word and score; and addressing is via the first list and the branch list.

5. The method as claimed in claim 4, further comprising the steps of:

after executing said matching and scoring for each of said test signals, reading out all lines of said search list and adding scores of each reference signal indicated by each line of the search list, comparing the aggregate score of the search list with a first threshold, and writing back only such lines of said search list for which the aggregate score does not surpass said first threshold; and discarding any line of said branch list indicating only discarded lines of said search list.

6. The method as claimed in claim 5, wherein:

each time a search list line of the search list which has an indication to a last reference signal of a series of reference signals corresponding to a word is written back, an indication to this word and an indication to the corresponding at least one predecessor word and the respective score is written into a new location of a word end list;

a language model value is added to each respective score to obtain a resulting score, thereby discarding all same ending words except an end word having a lowest resulting score; and not discarded locations of the word end list are transferred into new locations of a second memory.

7. The method as claimed in claim 6, further comprising the steps of:

generating for each line written back into the search list and indicating a last reference signal of a first tree branch, a line of the branch list containing indications to a number of lines in the search list, each line of the search list containing indications to reference signals for further tree branches following said first tree branch; and generating for each new word contained in a location of the word end list transferred to the second memory, a new line in the first list containing indications to a number of new lines of the branch list, each line of the branch list containing indications to a number of lines of the search list, each line of the search list containing indications to reference values of the first branches of the vocabulary tree.

8. The method as claimed in claim 5, further comprising the steps of:

generating for each line written back into the search list and indicating a last reference signal of a first tree branch, a line of the branch list containing indications to a number of lines in the search list, each line of the search list containing indications to reference signals of further tree branches following said first tree branch; and generating for each new word contained in a location of the word end list transferred to the second memory a new line in the first list containing indications to a number of lines of the branch list, each line of the branch list containing indications to a number of lines of the search list, each line of the search list containing indications to reference values of the first branches of the vocabulary tree.

9. The method as claimed in claim 2, further including the step of comparing all scores with a first threshold derived from a minimum score and discarding stored scores for which the stored score surpasses said first threshold.

10. The method as claimed in claim 1, further including the step of comparing all stored scores with a first threshold derived from a minimum score and discarding stored scores for which the stored score surpasses said first threshold.

11. The method as claimed in claim 10, wherein:

each indication in the first list to said new part of said first memory comprises an indication to a number of lines of a branch list;

each branch line list comprises an indication to a number of lines of search list;

each search list line comprises an indication to at least one reference signal to be used for matching and scoring with a next test signal;

an indication is given to the predecessor word test signal; and addressing is via the first list and the branch list.

12. The method as claimed in claim 10, wherein:

each indication in the first list to said new part of said first memory, comprises an indication to a number of lines of a branch list;

each branch list line comprises an indication to a number of lines of search list;

each search list line comprises an indication to at least one reference signal to be used for matching and scoring with the next test signal;

an indication is given to the predecessor word test signal; and addressing is via the first list and the branch list.

13. An apparatus for processing a sequence of words in a speech signal for speech recognition, comprising:

means for sampling, at recurrent instants, said speech signal for generating a series of test signals;

means for generating a signal-by-signal matching and scoring between said test signals and a series of reference signals, each of said series of reference signals forming one of a plurality of vocabulary words arranged as a vocabulary tree with a root, and a plurality of tree branches wherein any tree branch has a predetermined number of reference signals and as assigned to speech element and any vocabulary word is assigned to a particular branch junction or branch end;

means for determining at least one complete word for a particular test signal;

for each completed word, means for separately:

forming a word result including a word score and an aggregate score, said aggregate score derived from said word score and from a language model value assigned to a combination of said completed word and a uniform-length string of prior completed words;

storing said aggregate score starting at said root with a reference to said completed word;

proceeding with said signal-by-signal matching and scoring between subsequent test signals and said series of reference signals for each of a plurality of completed words for a particular test signal.

14. An apparatus for processing a sequence of words in a speech signal for speech recognition, comprising:

sampling means for, at recurrent instants, sampling said speech signal for generating a set of test signals;

tree storage means for storing a vocabulary tree that has a root and a plurality of branches, any branch comprising a series of one or more reference signals and being assigned to a speech element and any vocabulary word being assigned to a particular branch junction or branch end as being represented by a string of series of reference signals from said root to the particular branch junction or particular branch end;

model storage means for storing a plurality of language model values, each value uniquely assigned to a particular vocabulary word and a uniform-length string of prior completed words;

matching-and-scoring means fed by said sampling means, by said tree storage means and by said model storage means for executing a signal-by-signal matching and scoring between subsequent test signals and various strings thus determining at least one complete word, deriving a word result comprising a word score, an aggregate score derived from said word score and the language model score assigned to the particular word and a respective string of prior completed words, and a reference to a last word of said respective string of prior completed words;

copying means fed by said matching-and-scoring means for separately copying further non-identical word results from said matching-and-scoring means between subsequent test signals and said series of reference signals for each of a plurality of words completed for a particular test signal from the root of said tree into an intermediate memory;

decision means fed by said matching-and-scoring means and by said intermediate memory for selectively continuing or not continuing said series of reference signals based on the derived aggregate scores; and recognition decision means fed by said matching-and-scoring means and by said intermediate memory for recognizing speech of said speech signal based on a minimum score among the derived aggregate score for each non-identical word from the root of the tree.

* * * * *